(No Model.)
H. G. HANSEN.
HAY AND COTTON PRESS.
No. 340,307. Patented Apr. 20, 1886.
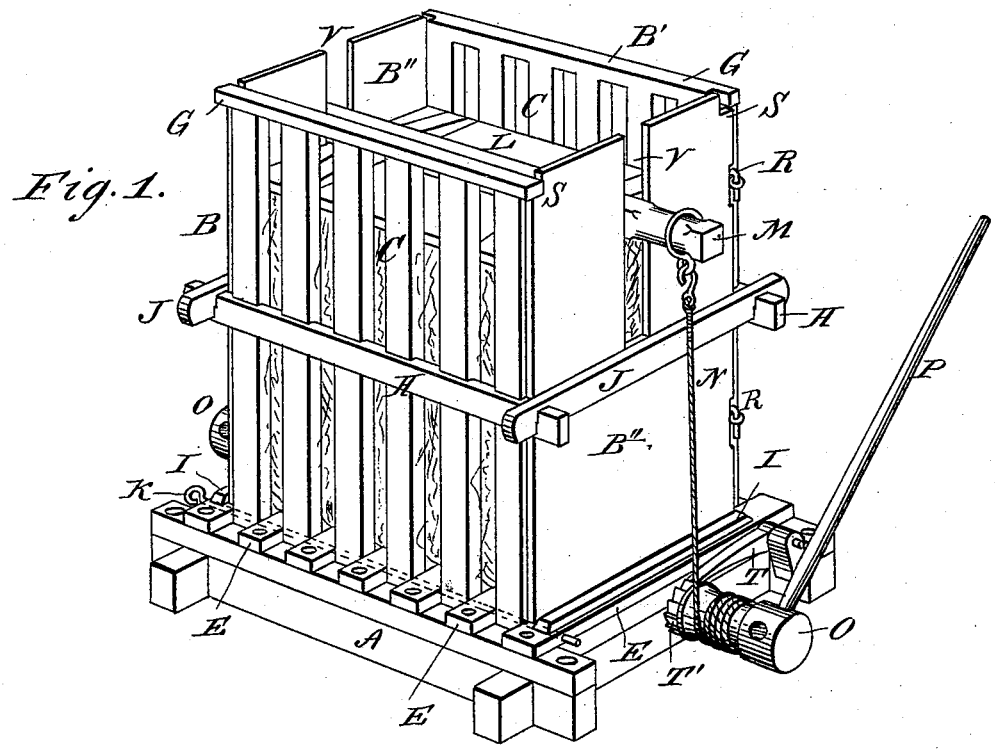
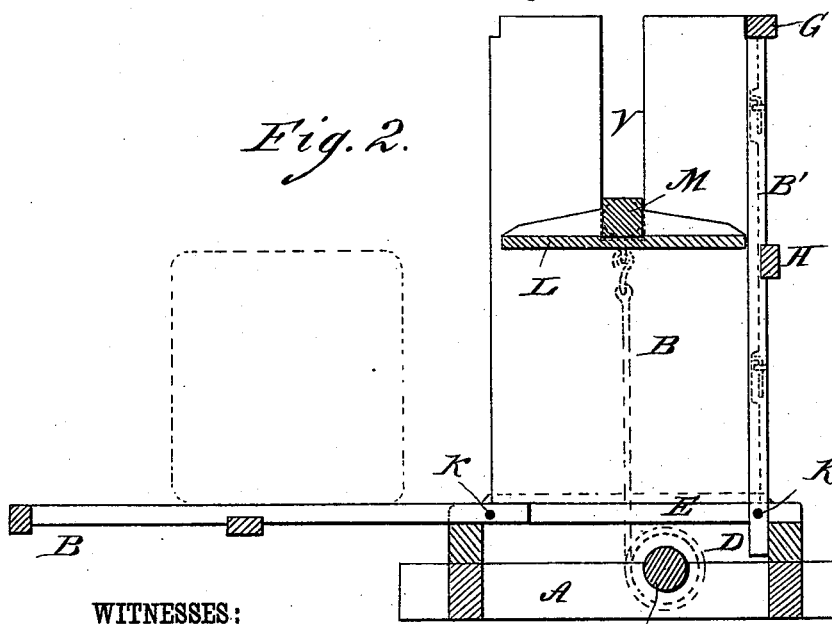
WITNESSES:
Donn Twitchell
C. Sedgwick
INVENTOR:
H. G. Hansen
BY Munn & Co
ATTORNEYS.

UNITED STATES PATENT OFFICE.

HANS G. HANSEN, OF CALUMET, MICHIGAN.

HAY AND COTTON PRESS.

SPECIFICATION forming part of Letters Patent No. 340,307, dated April 20, 1886.

Application filed October 3, 1885. Serial No. 178,901. (No model.)

*To all whom it may concern:*

Be it known that I, HANS G. HANSEN, of Calumet, in the county of Houghton and State of Michigan, have invented a new and Improved Hay and Cotton Press, of which the following is a full, clear, and exact description.

This invention consists, first, in a press for baling hay and cotton constructed in independent detachable sections, so as to be quickly set up for use and taken apart and compactly packed for storage or shipment, or for repairs; second, in constructing this sectional press so that when the bale of hay or cotton is completed and properly bound one side of the press may be turned downward to remove the bale and to form a platform upon which to receive the bale from the press.

Reference is to be had to the accompanying drawings, forming part of this specification, in which similar letters of reference indicate corresponding parts in both the figures.

Figure 1 represents a view in perspective of my improved press complete, showing a partially-compressed bale therein. Fig. 2 is a vertical central cross-section showing one of the hinged sides of the box turned downward and the bale in dotted lines removed from the press to the platform.

A in the accompanying drawings represents a rectangular frame or base, upon which are mounted the four sides composing the box to receive and hold the hay or cotton to be compressed. The two sides B B' are represented as composed of a series of upright strips, C, with alternate spaces between them, so that their lower ends, D, may extend downwardly and between a series of corresponding strips, E, which form the bottom of the box. The upright strips C are united at the top by upper rails, G, and midway by rails H, thus forming movable sections, as shown. The ends B'' of this box are represented as in one piece each, whose lower ends rest upon the frame A, and are held from spreading outwardly by strips I, secured to the frame.

To hold the upper ends of the four independent sides together, cross-bars J are halved into the extended ends of the rails H, so that the four sides, being firmly retained by the frame A at their lower ends and clamped by the cross-bars J, form a rigid upright box, as represented, in which the hay or cotton is to be compressed. The lower ends of the two sides B B' are pivoted to the frame A by removable rods K K, which form hinges upon which either side may be turned downward to remove the completed bale from the press, and to form a platform upon which to receive it, as shown in dotted lines, Fig. 2.

The follower L, beneath which the hay or cotton is to be compressed, is provided with a central cross-beam, M, extending through vertical openings V in the ends of the box, to the extended end of which are secured ropes N, to be wound around a shaft or windlass, O, secured in suitable bearings in the frame A, by which the follower is to be drawn down to compress and form the bale. This windlass is operated by a lever, P, as shown in Fig. 1, and in order to prevent the windlass turning backward as the hay or cotton is being compressed a pawl, T, is pivoted to the side of the frame A, which takes into a ratchet-wheel, T', secured to the windlass O. When the bale is sufficiently compressed, the ends of the cross-bars J are lifted out of the notches in the central rails, H, and the side turned down, so as to allow the finished bale to be removed from the press, and to form a platform upon which to receive it. When the bale is removed, the side is returned and locked by the cross-bars J, the follower raised so as to fill the box again with the hay or cotton for the next bale, and the operation of compressing repeated.

The side of the box not to be used as a door from which the completed bales may be removed from the press may be connected to the ends by bolts and staples R, as shown in Fig. 1.

In order to prevent the ends B'' of the box from rising off the frame A, they are notched beneath the upper rails, G, of the sides at S, Fig. 1.

When it is desired to take the press down for any purpose, the ropes N and follower L are removed, the cross-bars J disconnected, and by withdrawing the hinge-rods K the entire box may be quickly separated in sections, as described.

Having thus described my invention, what I claim as new, and desire to secure by Letters Patent, is—

1. In a hay and cotton press, the sides composed of a series of alternate strips and spaces, in combination with a bottom consisting of a corresponding series of strips and spaces, so as to receive the hinged ends of the sides in the spaces between the bottom strips, substantially as herein described.

2. In a press for baling hay and cotton, the independent detachable sides and base, constructed and arranged substantially as herein described, having the independent ends B'', notched below the side rails, G, substantially as and for the purpose herein set forth.

HANS G. HANSEN.

Witnesses:
FRED MACKENZIE,
HENRY HARPER.